(12) United States Patent
Mayer

(10) Patent No.: US 9,963,325 B2
(45) Date of Patent: May 8, 2018

(54) ENCLOSING FRAME, METHOD FOR MOUNTING AN ENCLOSING FRAME, AND USE OF AN ENCLOSING FRAME FOR CONNECTING A SLEWING TOWER CRANE TO AN OBJECT

(71) Applicant: Liebherr-Werk Biberach GmbH, Biberach an der Riss (DE)

(72) Inventor: Joachim Mayer, Biberach (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 475 days.

(21) Appl. No.: 14/429,679

(22) PCT Filed: Sep. 19, 2013

(86) PCT No.: PCT/EP2013/002821
§ 371 (c)(1),
(2) Date: Mar. 19, 2015

(87) PCT Pub. No.: WO2014/044395
PCT Pub. Date: Mar. 27, 2014

(65) Prior Publication Data
US 2015/0225211 A1    Aug. 13, 2015

(30) Foreign Application Priority Data

Sep. 19, 2012   (DE) .................. 10 2012 018 524

(51) Int. Cl.
*B66C 23/20*    (2006.01)
*F16M 13/02*    (2006.01)

(52) U.S. Cl.
CPC ............ *B66C 23/208* (2013.01); *B66C 23/20* (2013.01); *F16M 13/02* (2013.01); *Y10T 29/49625* (2015.01)

(58) Field of Classification Search
CPC ...... B66C 23/208; B66C 23/20; F16M 13/02; Y10T 29/49625
See application file for complete search history.

(56) References Cited

FOREIGN PATENT DOCUMENTS

| | | |
|---|---|---|
| FR | 2 803 865 A1 | 7/2001 |
| JP | 2005-112518 A | 4/2005 |
| JP | 2010-6481 A | 1/2010 |
| JP | 2011-241084 A | 12/2011 |
| KR | 10-2006-0105938 A | 10/2006 |
| KR | 10-0825255 | 4/2008 |

OTHER PUBLICATIONS

International Search Report (PCT/ISA/210) dated Nov. 4, 2013, with English translation (six (6) pages).
German-language Written Opinion (PCT/ISA/237) dated Nov. 4, 2013 (five (5) pages).

*Primary Examiner* — John C Hong
(74) *Attorney, Agent, or Firm* — Crowell & Moring LLP

(57) ABSTRACT

A surrounding frame can be attached to a crane tower of a tower slewing crane and can connect the tower slewing crane to an object, for example a building, having a flexurally stiff connection element and a latching element. The connection element is provided in the form of an element that horizontally supports the crane tower in the anchorage plane at two outer sides. A method of assembling the surrounding frame and a use of a surrounding frame for connecting a tower slewing crane to an object are also described.

7 Claims, 2 Drawing Sheets

ENCLOSING FRAME, METHOD FOR MOUNTING AN ENCLOSING FRAME, AND USE OF AN ENCLOSING FRAME FOR CONNECTING A SLEWING TOWER CRANE TO AN OBJECT

BACKGROUND OF THE INVENTION

The present invention relates to a surrounding frame which can be attached to a tower slewing crane and via which the tower slewing crane can be connected to an object such as a building.

The invention furthermore relates to a method of assembling the surrounding frame at a tower slewing crane, and to a use of the surrounding frame for connecting a tower slewing crane to an object.

When using tower slewing cranes, it is frequently necessary, particularly with high hook heights, to anchor the crane tower to an object such as to a building and thus to stabilize the crane tower in a particularly economic manner. The crane tower is typically surrounded by a so-called surrounding frame for this purpose which is connected to the crane tower without play and which can thus absorb the forces acting horizontally on the crane by direct contact. Anchorage braces which in turn connect the surrounding frame to the object and are anchored therein conduct the forces from the crane tower ultimately into the object.

As a rule in this respect, the surrounding frame comprises a U-shaped element which comprises a center section and two end sections and which surrounds the crane tower, which has a quadrangular cross-section, from three sides. The surrounding frame furthermore comprises a latching element which is supported in an articulated manner at the U-shaped element and which surrounds the crane tower at a fourth side in a closed position.

The center section of the U-shaped element of the surrounding frame is frequently facing the object to which the tower slewing crane is to be connected so that the anchorage braces connected to the object can be fixed in the region of the center section of the U-shaped element.

A surrounding frame designed in this manner admittedly satisfies the demands with respect to the stabilization of the tower slewing crane which is achieved by the connection of the crane tower to an object, but problems arise on the assembly of the surrounding frame at the tower slewing crane.

A crane which holds the surrounding frame at a suspension point and conveys it into an assembly position is used for assembling the surrounding frame for obvious reasons. In this respect, the surrounding frame hangs perpendicular in the air in a transport position during the transport from a storage position which is located in the proximity of the crane, but remote from the assembly position, to an assembly position which is located at a specific height of the crane tower. Since, however, the assembly position requires a horizontal position of the surrounding frame, it is necessary to rotate the surrounding frame from the transport position by 90° into the assembly position and to position the surrounding frame in the now horizontal assembly position such that the crane tower is located within the U-shaped element. Instead of a transport position perpendicular in the air, the surrounding frame can also already be held in a horizontal position on the transport to the assembly position. It is fastened to at least three points of the frame for this purpose. In this case, the suspension is admittedly more complicated to effect, but in turn, however, the rotation by 90° from the transport position into the assembly position is omitted.

It must be ensured in this respect that the two end sections of the U-shaped element do not collide with the structure of the crane tower. For this purpose, additional securing means such as chains or ropes are typically provided which are fixed to the tower construction and which are suitable for taking up the weight of the surrounding frame and for its positioning.

SUMMARY OF THE INVENTION

It is an object of the invention to provide a surrounding frame of the initially stated kind which can be brought simply and fast from a storage position via an elevated position into an assembly position and which can be brought back just as simply and fast from this assembly position into a storage position. It is additionally an object of the invention to provide a method of assembling a surrounding frame in accordance with the invention and its use for connecting a tower slewing crane to an object.

This object is achieved in accordance with the invention by a surrounding frame as claimed. Preferred embodiments of the invention form the subject matter of the dependent claims. The object is furthermore achieved by method and by use of the apparatus in accordance with the claims.

The surrounding frame which underlies this invention, which can be attached to a crane tower of a tower slewing crane and which can connect the tower slewing crane to an object, for example to a building, comprises a flexurally stiff connection element and a latching element, wherein the connection element is provided in the form of an element which horizontally supports the crane tower in the anchorage plane at two outer sides. In accordance with an embodiment, a bracket-shaped form of the connection element results here. The use of a bracket-shaped element instead of a U-shaped element has the meaning for the assembly that, on the positioning of the surrounding frame at the crane tower, two end sections of the U-shaped element cannot come to collide with the camera tower and have to be taken into account in a correspondingly complex manner in the positioning, as with the U-shaped element, but rather that only one section comparable to an end section has to be taken into account on the positioning. This represents a substantial simplification in the assembly of surrounding frames.

The surrounding frame, which advantageously comprises at least one auxiliary suspension section at which an auxiliary suspension can be attached via which the surrounding frame can be connected to the tower slewing crane, can now be brought more simply into the assembly position by means of this auxiliary suspension, since a collision with a second section, which is not present in accordance with the invention and which corresponds to an end section of the U-shaped element, is not possible. The auxiliary suspension can in this respect be provided in different embodiments. It can comprise a rigid element, e.g. a metal beam, or can also be present in a flexible embodiment. It is particularly advantageous in this respect for the auxiliary suspension to comprise a rope.

An advantage of the auxiliary suspension comprises a good self-positioning of the frame during the letting down of the surrounding frame from an elevated position into the assembly position with a corresponding attachment of the auxiliary suspension.

Whereas, on the letting down of the surrounding frame from an elevated position into the assembly position, the auxiliary suspension contributes to a correct positioning, on the one hand, it is particularly advantageous, on the other hand, for the surrounding frame to comprise at least one support section at which the surrounding frame can be contacted by at least one support console in a horizontal position and can be fixed by it. This applies in particular in the assembly position.

The auxiliary suspension, support console and support section in conjunction with the bracket-shaped configuration of the connection element and with the corresponding selection of the suspension point of the surrounding frame thus allow a positioning of the surrounding frame into the assembly position which is simpler in comparison with the prior art.

It is advantageous for the purpose of surrounding the crane tower by the surrounding frame for a latching element to be provided which comprises two latching bars which are connected to one another in an articulated manner and which are connected to the connection element in an articulated manner. The latching element in this respect surrounds the crane tower in a closed position, on the one hand, at the sides at which the crane tower is not surrounded by the connection element. In an open position, the latching element can be positioned, on the other hand, such that it is not an obstacle on the positioning of the connection element into the assembly position.

The articulated design of the latching element furthermore allows a folding down of the latching element so that it can be provided in a space saving manner, on the one hand, and so that no additional connection step of the two latching bars to one another during the assembly process is necessary, on the other hand. There is a further advantage in that due to the articulated provision of the latching element, a secure simultaneous transport of the latching element and the connection element, that is the transport of the complete surrounding frame, from a storage position to an assembly position is possible. The latching element can in this respect be folded into the open position on the transport such that, on the one hand, the positioning of the connection element into the assembly position at a crane tower is possible and such that, on the other hand, the latching element can be folded simply by means of the articulated connections into the closed position and thus into the operating position on reaching the assembly position.

It is furthermore advantageous for at least one fastening section to be provided at the bracket section to which fastening section at least one anchorage brace can be fastened which can be connected to the object. The connection of the at least one fastening section to the at least one anchorage brace ensures that the horizontal forces which act on the crane in all directions can ultimately be introduced into the building.

All conceivable elements can be provided as an anchorage geometry such as openings, eyelets or hooks at the at least one fastening section so that a linking of the crane to the object can take place in accordance with different circumstances which may apply at the installation location of the crane. It is particularly advantageous if, in this respect, the at least one fastening section comprises at least one opening as the anchorage geometry. It is thus conceivable with the aid of a corresponding anchorage geometry to fit the surrounding frame and here specifically its connection element into building corners or building projections which may be present in a building or to provide the anchorage geometry such that an oblique positioning of the crane toward the outer object side is made possible.

On the introduction of the horizontal forces acting in all directions into an object stabilizing the crane, it is moreover advantageous for at least one support section to be provided at the connection element and at the latching element, the support section supporting the surrounding frame with respect to the crane tower and/or for at least one latching section to be provided for surrounding at least one corner bar of the crane tower between the at least one latching section, on the one hand, and the connection element and/or the latching element, on the other hand. This at least one support section can be manufactured from a material such as rubber which has a smaller hardness than the material resistant to pressure such as rubber, etc. of the crane tower and the surrounding frame and which thus ensures that damage to the corrosion layer is prevented which may be the consequence of a direct contact of the surrounding frame and the crane tower. The at least one latching section advantageously allows corner bars of the tower slewing crane to be reinforced.

The invention furthermore relates to a method of assembling a surrounding frame in accordance with the invention to a tower slewing crane, wherein, in a first step the surrounding frame is connected to a crane suspension of a crane, in a second step, the surrounding frame is raised into an elevated position by means of the crane, in a third step, the surrounding frame is connected to the crane tower by means of the auxiliary suspension, in a fourth step, the surrounding frame is conveyed into an assembly position at the crane tower, and in a fifth step, which is a latching step, the latching element is brought from the open position into the closed position.

The present invention is furthermore directed to a use of a surrounding frame in accordance with the invention for connecting a tower slewing crane to an object.

BRIEF DESCRIPTION OF THE DRAWINGS

The invention will be explained in detail in the following with reference to the drawing figures.

DETAILED DESCRIPTION OF THE INVENTION

Figure 1:
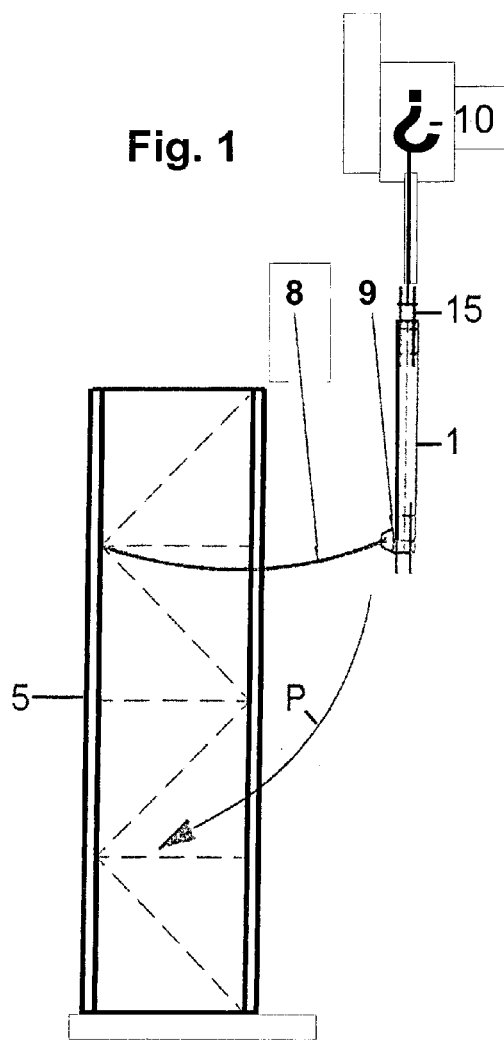
FIG. 1 shows the assembly situation at the start of the fourth step of the assembly process with the surrounding frame in an elevated position.

FIG. 1 shows the fourth step in the assembly of the surrounding frame 1 in accordance with the invention at the crane tower 5, wherein the surrounding frame 1 is in an elevated position. For this purpose, a crane suspension 10 and a corresponding crane (not shown) are connected to the surrounding frame 1 and the surrounding frame 1 is raised by the crane. At a corresponding height, the surrounding frame 1 is then connected to the crane tower 5 via the auxiliary suspension 8 and the auxiliary suspension section 9. The surrounding frame 1 is now brought into or close to the assembly position on the letting down in accordance with the arrow P. The auxiliary suspension 8 is in this respect fastened to the crane tower 5 such that a force acting via it onto the support frame 1 on the letting down of the surrounding frame 1 brings the latter into the desired position or into the proximity of the desired position.

Figure 2:
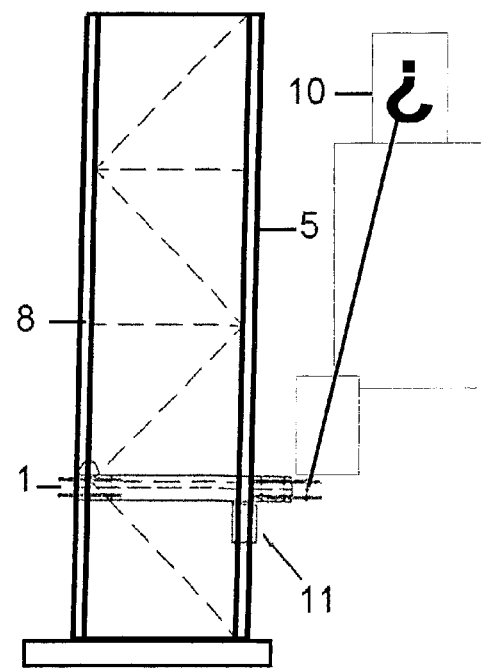
FIG. 2 shows the assembly situation at the start of the fourth step of the assembly process with the surrounding frame in the assembly position.

FIG. 2 shows the surrounding frame 1 after it has been brought from the elevated position into the assembly position. It can be recognized in this respect that the auxiliary suspension 8 and the support console 11 are arranged such that the surrounding frame 1 is held in the desired assembly position by them. As can be recognized in FIG. 2, the surrounding frame 1 is in a horizontal position, which is made possible in that the crane suspension 10 engages at a corresponding position 15 at the surrounding frame 1. As is shown in the embodiment of FIG. 2, the horizontal position of the surrounding frame 1 can therefore be made possible by the corresponding positioning of the surrounding frame 1 at the auxiliary suspension 8, at the support console 11 and at the crane suspension 10.

Figure 3:
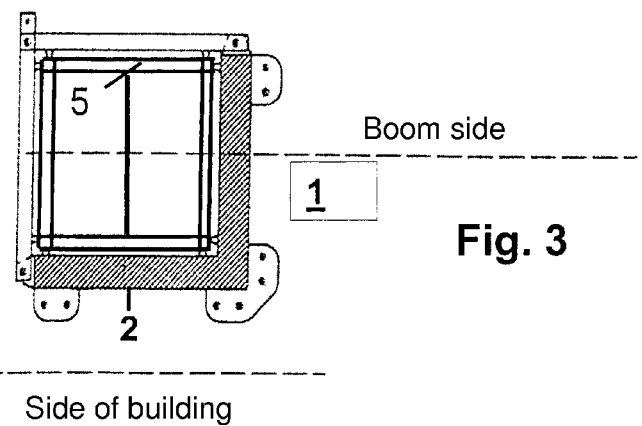
FIG. 3 shows a plan view with the crane tower, the surrounding frame and the building.

FIG. 3 shows the surrounding frame 1 in accordance with the invention in the operating position. Next to it, the side of a building is shown as an object to which the surrounding frame 1 can be fastened. It becomes clear in this respect that an assembly step shown in FIG. 1 in which the surrounding frame 1 is placed laterally and from above at the crane tower 5 is not possible in this manner with a U-shaped surrounding frame corresponding to the prior art. On the swinging in of the surrounding frame, the end section of the U-shaped element, which is first incident on the crane tower in the surrounding frame known from the prior art, would collide with said crane tower and would make a swinging in accordance with the invention impossible. It is only possible finally to move via the assembly step shown in FIGS. 1 and 2 and via the latching step shown in FIG. 4 to the operating position shown in FIGS. 3 and 5 in that such a disruptive end section is missing in the connection element 2 in accordance with the invention.

Figure 4:
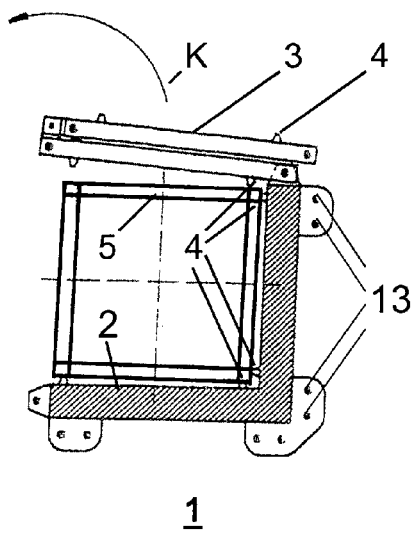
FIG. 4 shows the assembly situation at the start of the fifth step of the assembly process, with the surrounding frame being in the assembly position and with the latching element being in the open position.

FIG. 4 shows a sectional view of a surrounding frame 1 and of a crane tower 5 in the assembly position. The situation shown corresponds to the fifth step of the assembly process. It can be seen in this respect that the connection element 2 is connected to the crane tower 5 via the support sections 4. The latching element 3 in this respect does not contact the crane tower 5, but is rather in an open position. As the arrow K illustrates, it can be folded into a closed position due to its articulated connection.

Figure 5:
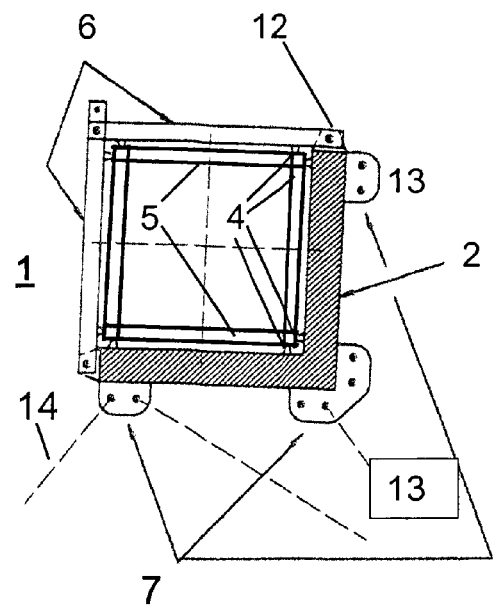
FIG. 5 shows the surrounding frame at the end of the assembly process and in the operating position, with the latching element being in the closed position.

FIG. 5 shows a sectional view of a surrounding frame 1 and of a crane tower 5 in the operating position. It can be seen in this respect that the latching bars 6 were folded such that the surrounding frame 1 now surrounds the crane tower 5 and is in contact therewith via the support sections 4. The two latching bars 6 are connected at least two connection sections 12 to the connection element 2 in the operating position and are located in the closed position.

In the operating position, forces acting horizontally on the crane tower 5, that is which are in the plane of the drawing, can now be forwarded via the support sections 4 to the surrounding frame 1. In order in turn to forward these forces from the surrounding frame 1 via anchorage bars 14 (indicated in FIG. 5) to an object supporting the tower slewing crane, a plurality of fastening sections 7 are provided at the connection element 2. In the present embodiment, three fastening sections 7 are shown each having two or four openings 13 as the anchorage geometry for the fastening of the anchorage braces 14. However, in accordance with the invention, any desired number of fastening sections 7 and anchorage geometry of any desired design can be provided.

Figure 6:
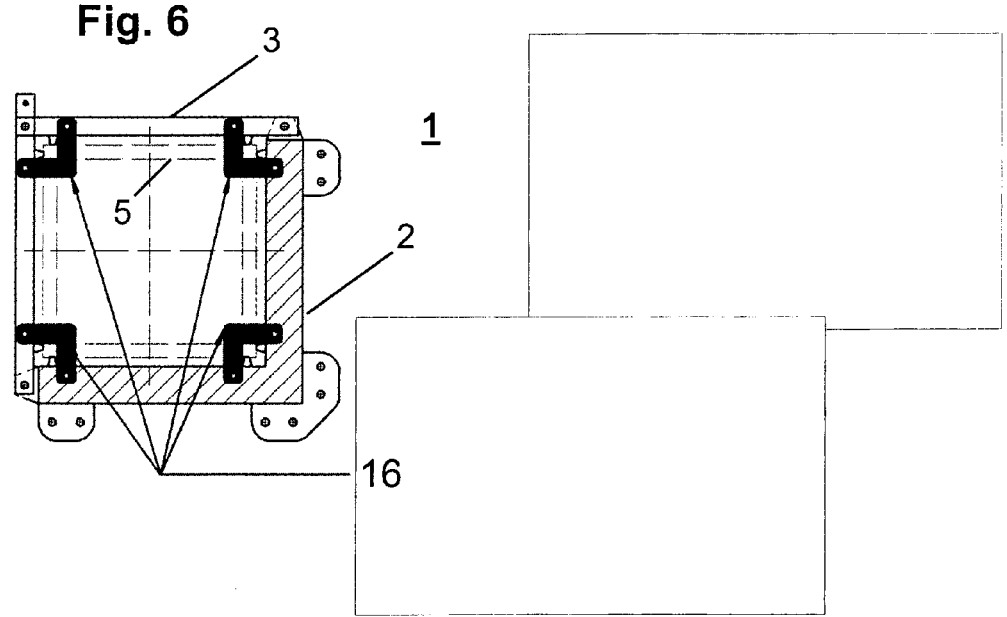
FIG. 6 shows the surrounding frame with four latching sections.

FIG. 6 shows four latching sections 16 which can be connected to the connection element 2 and to the latching element 3 to reinforce the corner bars such that the crane tower 5 or its corner bars are surrounded between latching sections 16, on the one hand, and the connection element 2 and/or the latching element 3, on the other hand, and are thereby reinforced. A substitute tower reinforcement can hereby be achieved.

The invention claimed is:

1. A surrounding frame that can be attached to a crane tower of a tower slewing crane and that can connect the tower slewing crane to an object, comprising:
   a flexurally stiff connection element,
   a latching element, and
   at least one auxiliary suspension section, to which an auxiliary suspension is attachable, which connects the surrounding frame to the tower slewing crane,
   wherein the connection element horizontally supports the crane tower in an anchorage plane at two outer sides.

2. The surrounding frame in accordance with claim 1, wherein the auxiliary suspension comprises a rope.

3. The surrounding frame in accordance with claim 1, further comprising at least one support section at which the surrounding frame can be contacted by at least one support console in a horizontal position and which can be fixed by the support console.

4. The surrounding frame in accordance with claim 1, wherein the latching element comprises two latching braces, connected to one another in an articulated manner, that are connected to the connection element in an articulated manner.

5. The surrounding frame in accordance with claim 4, further comprising at least one fastening section provided at a bracket section and at least one anchorage brace that is fastenable to said at least one fastening section, with an anchorage brace being connectable to the object.

6. The surrounding frame in accordance with claim 5, wherein the at least one fastening section comprises at least one opening as anchorage geometry.

7. The surrounding frame in accordance with claim 1, further comprising at least one support section provided at the connection element and at the latching element that supports the surrounding frame against the tower slewing crane.

* * * * *